United States Patent

[11] 3,608,956

| [72] | Inventor | Joseph Adamski<br>Brooklyn, Mich. |
|---|---|---|
| [22] | Filed | June 2, 1969 |
| [45] | Patented | Sept. 28, 1971 |
| [73] | Assignee | Dura Corporation<br>Oak Park, Mich. |

[54] FOLDING TOP MECHANISM FOR CONVERTIBLE-TYPE AUTOMOBILE
7 Claims, 7 Drawing Figs.

| [52] | U.S. Cl. | 296/117 |
|---|---|---|
| [51] | Int. Cl. | B60j 7/12 |
| [50] | Field of Search | 296/116, 117 |

[56] References Cited
UNITED STATES PATENTS

| 3,180,675 | 4/1965 | Adamski | 296/117 |
|---|---|---|---|
| 3,411,821 | 11/1968 | Adamski | 296/117 |

Primary Examiner—Leo Friaglia
Assistant Examiner—Winston H. Douglas
Attorney—Stowell & Stowell ABSTRACT: A folding top mechanism is provided in which the conventional control link is replaced by use of a pair of side-by-side generally parallel rear rail components thereby materially increasing the seating space in the rear seat of convertible vehicles providing clean interior lines thereby improving the safety factor, which in the past, has been relatively lower for convertible automobiles than for metal top vehicles, and also increasing the rigidity of the mechanism in the extended position.

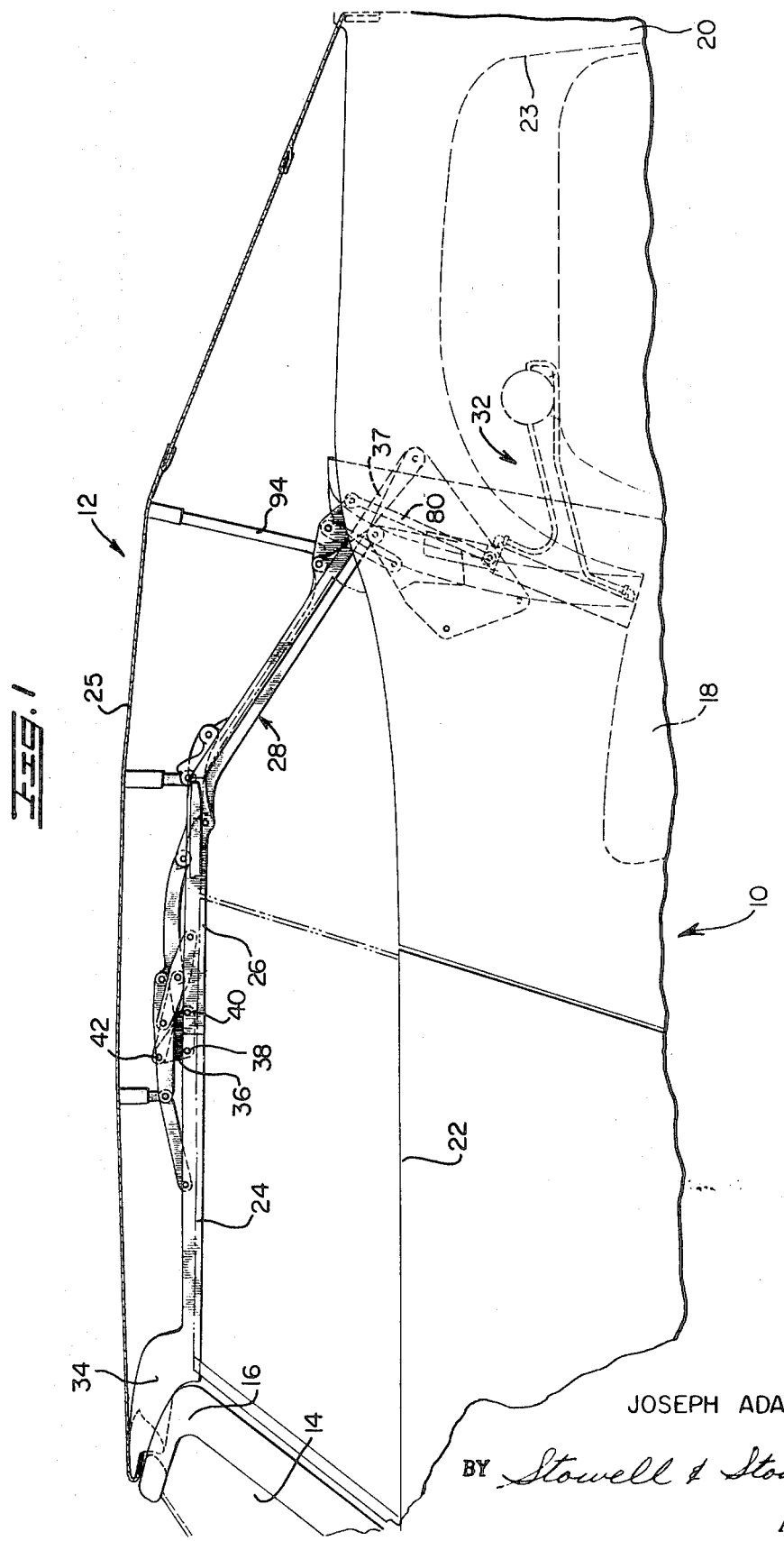

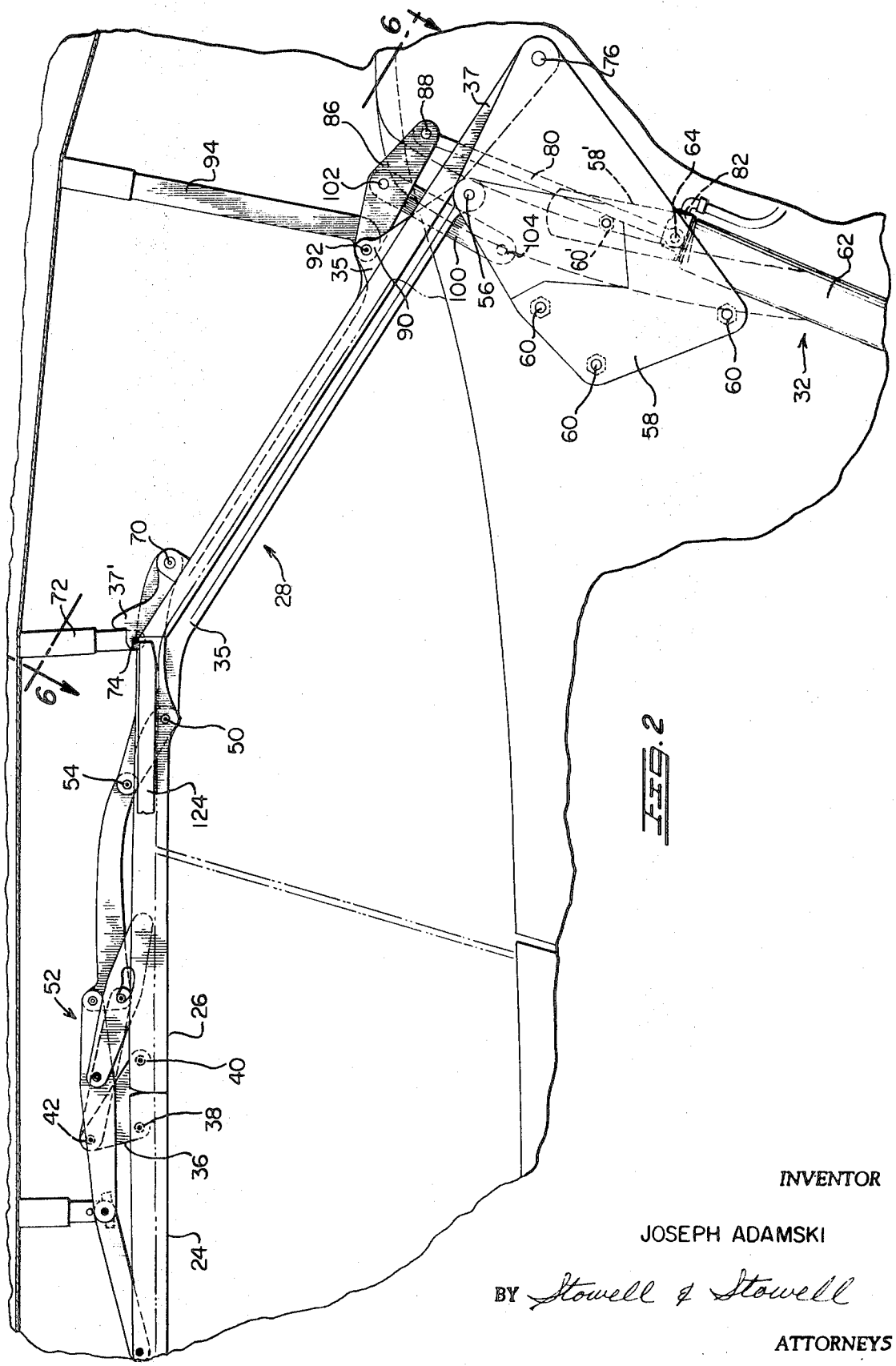

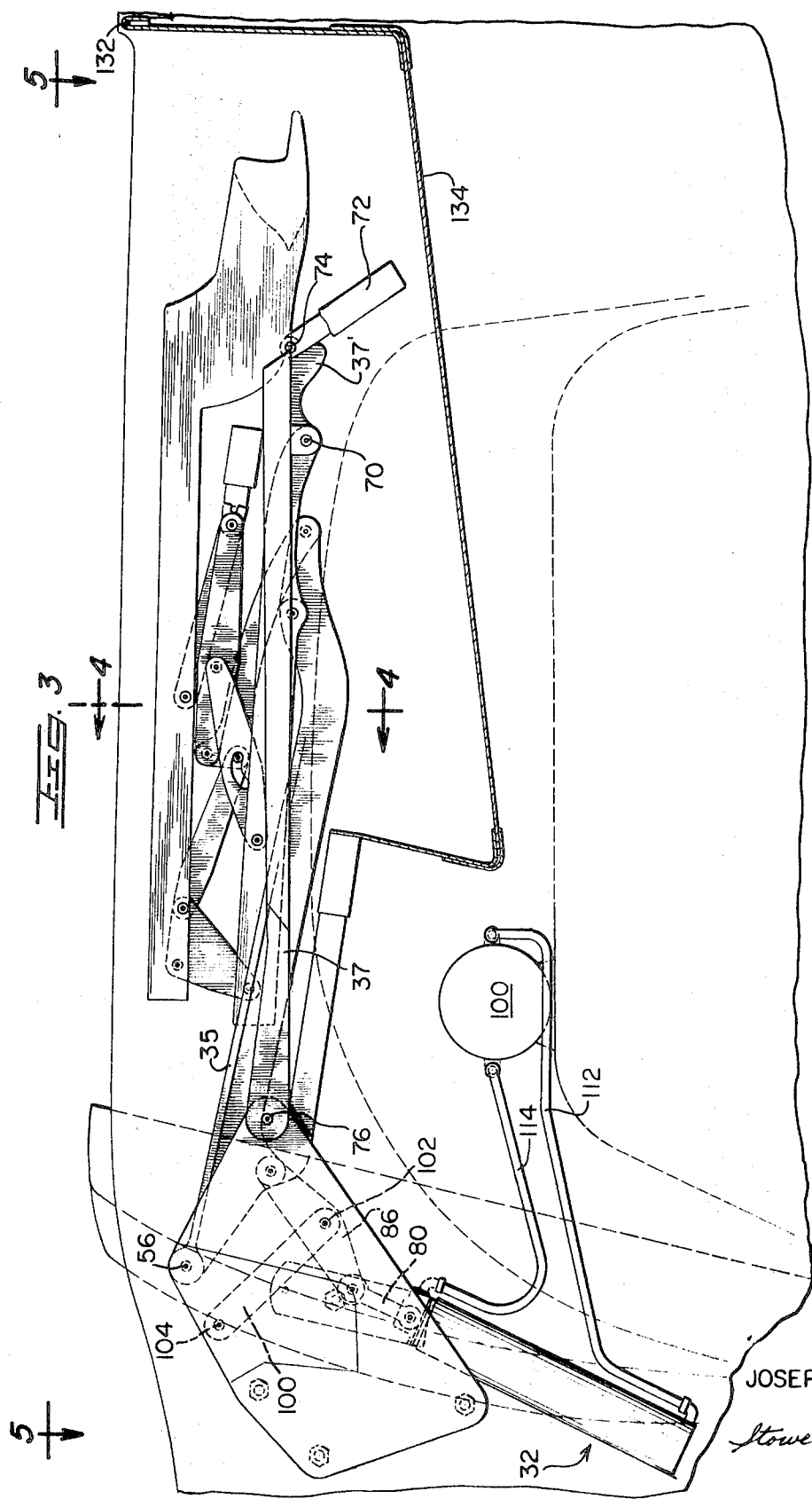

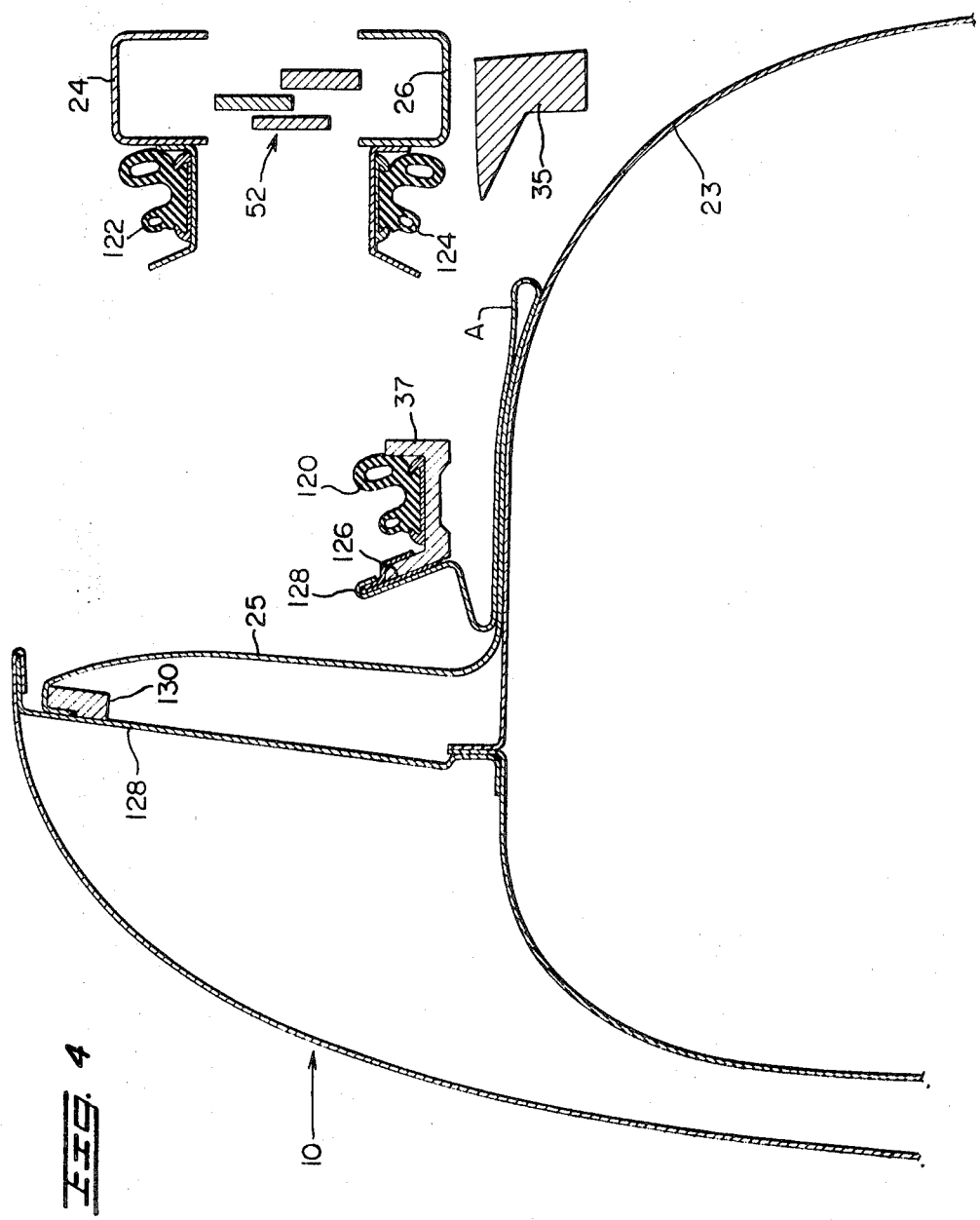

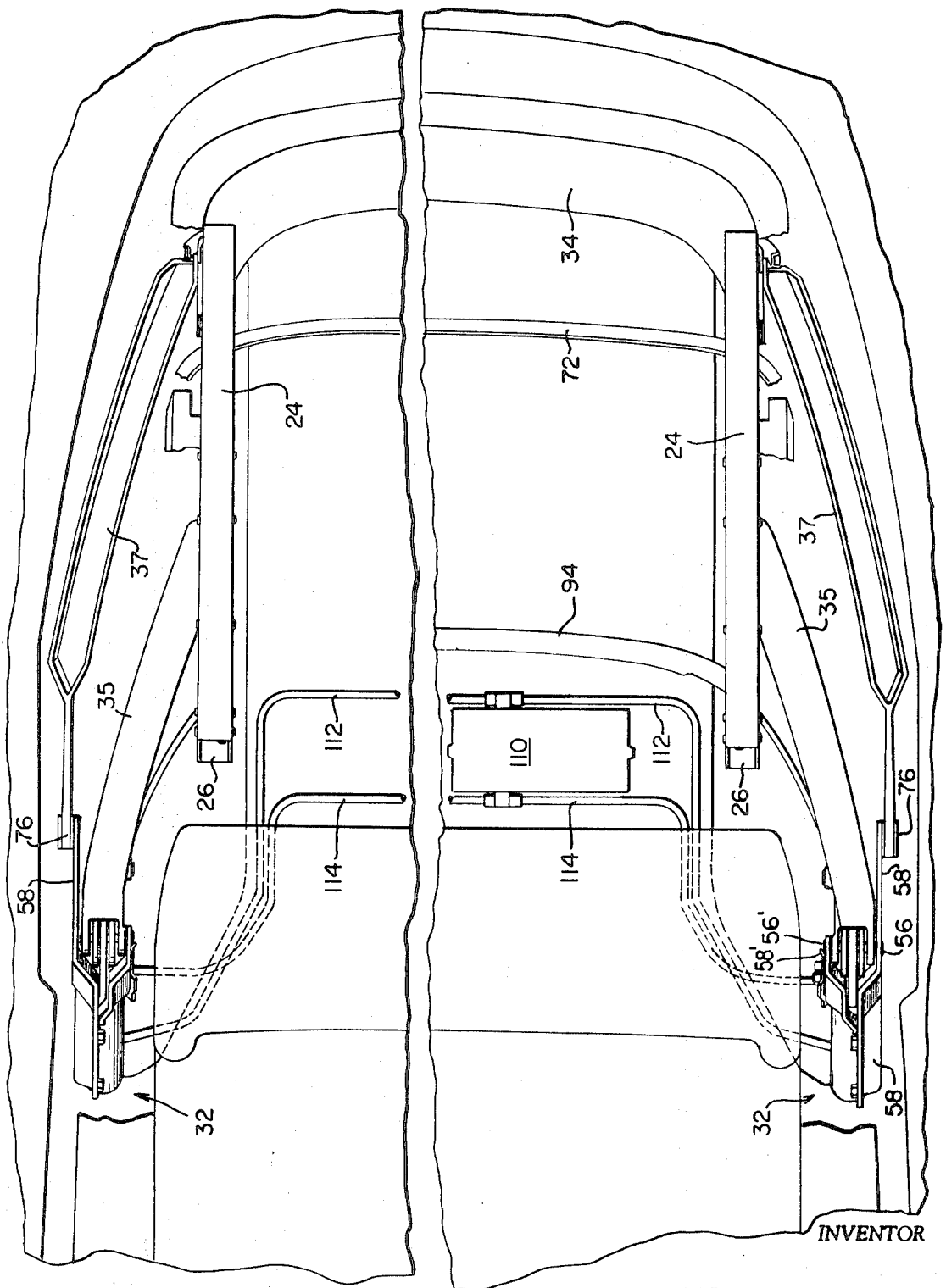

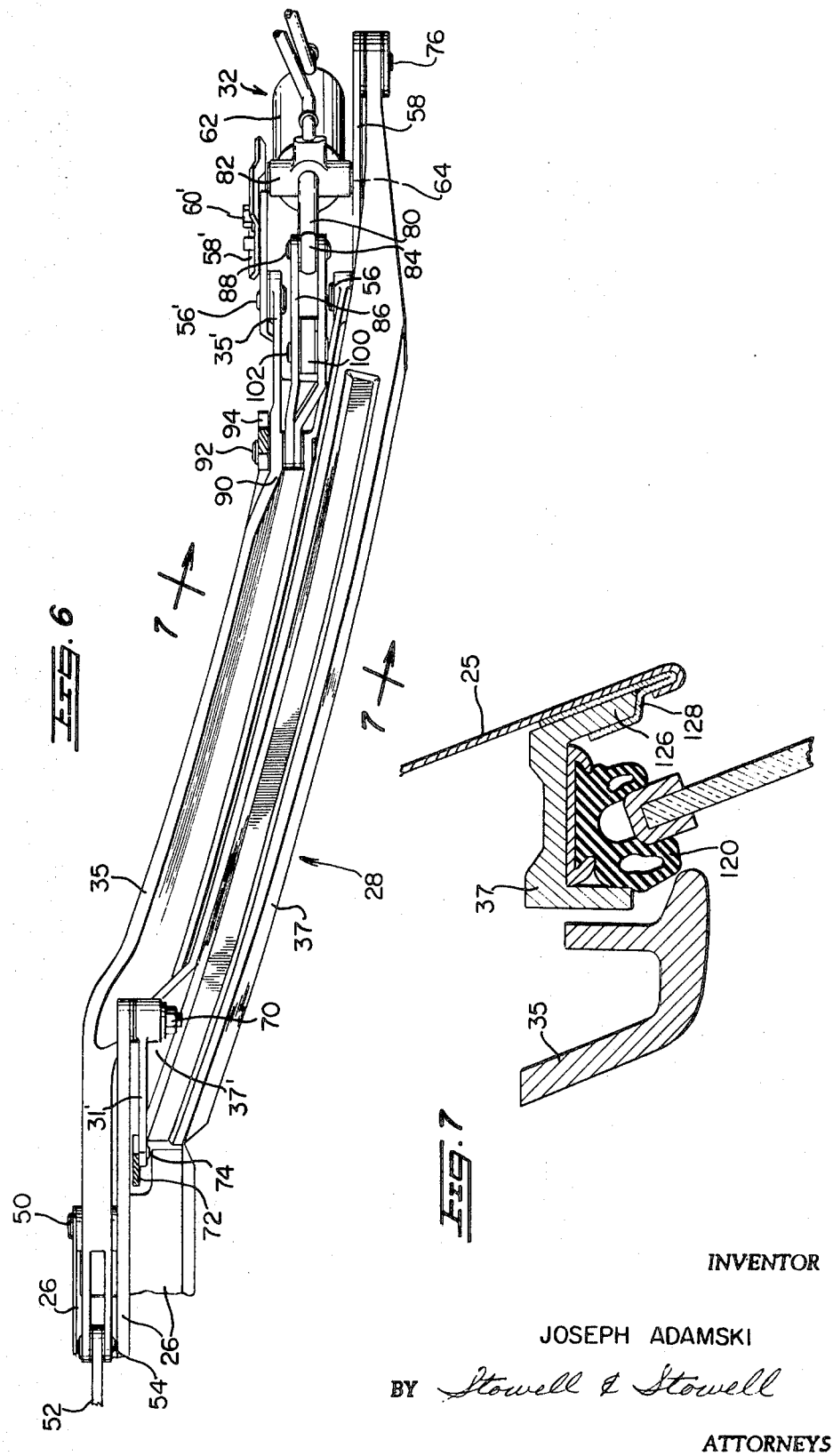

3,608,956

FOLDING TOP MECHANISM FOR CONVERTIBLE-TYPE AUTOMOBILE

It is primary of the present invention to provide a folding top mechanism for a convertible automobile having reduced numbers of moving parts on the inner exposed sides of the top of the vehicle.

It is a further object to provide actuating mechanisms for an automotive folding top which provides for greater passenger room across the rear seat of the automobile.

A further object is to provide an improved folding top actuating mechanism which substantially reduces fabric bending and binding during folding top storage in its retracted position.

The above and other objects are primarily provided in a convertible top actuating mechanism wherein the conventional control link is eliminated and the function of the control link and other functions are provided by a pair of rear rails which are in side-by-side generally parallel spaced relationship when the vehicle top is in the open position and such pair of rear rails are substantially displaced both laterally and longitudinally when the mechanism is in the retracted position to thereby eliminate tight fabric bends and fabric pinching during storage of the convertible top.

Another object of the invention is to provide a convertible top mechanism which is designed to reduce to a minimum inwardly projecting rods and links to provide a smoother interior configuration in keeping with the desire to provide improved safety in automobile vehicles.

These and other objects and advantages are provided without sacrificing strength and rigidity, rattle-free construction, a low profile and a substantial degree of rotation from the fully opened to the fully retracted positions.

It is a further object of the present invention to provide such mechanism having relatively low-power requirements for extending or retracting and wherein the linear actuator for the top has a relatively short operating stroke.

It is an object of this invention to provide a mechanism for a folding top which will permit a more compact stacking to the top rearward of the rear seat by allowing the side by side rear rail components to be positioned partially around the wheel house panel configuration instead of entirely against the top most portion of such wheel house surfaces.

It is an object of this invention to provide a mechanism for a folding top wherein the outer one of the side-by-side rear rail components is used for the function of controlling the positioning of the top rails of the mechanism as they pivotally reside upon the upper part of the inner one of the rear rails.

It is an object of this invention to provide a top mechanism for a folding top wherein the outer one of the side by side rear rails is utilized fasten the fabric top decking along with the pliable weather sealing strips.

It is an object of this invention to provide a folding top mechanism wherein the outer one of the side by side rear rails are so positioned relative to each other on their lower pivotal mountings so that the inner one of these rear rail components functions as a compression member and the outer one of the rear rails functions as a tensing member in the overall force reactions resident throughout the grouping of all the components of the folding top mechanism.

It is a further object to provide a folding top mechanism wherein the rear rail inner component is extended above and beyond its attachment to the center rail so as to drive the linkage of the upper rails.

Other objects of this invention are to provide a folding top structure for a convertible motor vehicle which is relatively simple in construction, light in weight, easy to assemble and may be installed as a preadjusted subassembly in a vehicle body.

In general the invention comprises a convertible top mechanism including a pair of generally side-by-side rear rails, means pivotally mounting the rearward end of each of the rear rails to a vehicle body, a center rail, means pivotally mounting the other end of each of the rear rails to the center rail, actuator means pivotally connected to the innermost of the pair of rear rails, and fabric-trim-supporting means connected to the outer surface of the outermost of the pair of rear rails along with weather sealing strips.

The invention will be more fully described and other objects and advantages will be apparent from the following detailed description of the invention when considered in light of the drawings, wherein:

FIG. 1 is a vertical section through one side of the operating linkage of a convertible top shown in the extended position with certain portions of the vehicle body omitted and other portions shown in broken lines;

FIG. 2 is a fragmentary enlarged view of a portion of the structures shown in FIG. 1 of the drawing:

FIG. 3 is a view of the vehicle top shown in FIG. 1 in the rearward folded position;

FIG. 4 is a section on line 4—4 of FIG. 3 and illustrates the freedom from tight folds of the roof fabric when the roof is in the folded position;

FIG. 5 is a top plan view looking in the direction of the arrows 5—5 of FIG. 3 with the convertible top in the folded position;

FIG. 6 is a section on line 6—6 of FIG. 2; and

FIG. 7 is a section on line 7—7 OF FIG. 6.

Referring to the drawings and FIGS. 1 through 3 and 5 in particular, a vehicle body 10 is shown partially in phantom lines and is provided with a folding top 12 which is shown as erected and extended thereover in FIGS. 1 and 2 and folded in FIGS. 3 and 5.

The vehicle body 10 is shown sufficiently to identify the windshield 14 having a header bar 16 and a rear seat 18 behind which is provided the trunk area and space 20 receptive of the folding top 12 in its fully retracted and stored position. The vehicle belt line 22 and rear wheel housing 23 are also shown and identified for general reference purpose.

In the subsequent discussion of the folding top 12 and the operative mechanism thereof, reference made to the "forward" or "rearward" disposition of any member, or the use of like terms, is to be understood as with regard to the extended position thereof with respect to the front or back ends of the vehicle 10 on which the top is provided.

The top structure 12 includes articulated side frame rails and interconnected cross bows which form a frame work over which a fabric cover 25 is extended. The side frame rails are each made up of a front side frame rail section 24, a center side frame rail section 26 and a pair of rear side frame rail sections 28. The articulated side frame rails are symmetrically opposite and are power operated by actuating means 32.

As to be more fully described hereinafter, the pair of rear rails 28 includes inner rail 35 and outer rail 37.

As will be appreciated, the actuating means 32 are interconnected for synchronous operation and are mounted on the vehicle body.

The front side rail section 24 have a top header 34 provided across their forward ends and formed for engagement with the windshield hear bar 16. A pivot plate member 36 is connected to the rear end of the front side rail section 24 and to the forward end of the center rail section 26. The pivot plate is triangular in shape with spaced pivot connections 38 and 40 for engagement with the front and center side rail sections 24 and 26, respectively, and with a third pivotal connection 42 disposed apart therefrom for connection to an operating link in a manner described in my U.S. Pat. 3,180,675, dated Apr. 27, 1965.

Referring particularly to FIGS. 2 and 6, the pair of rear rails 28, comprising inner rail 35 and over rail 37, are generally similar in configuration and when the convertible top is in the extended position the pair of rails lie in generally parallel closely spaced side-by-side relationship.

The inner rail 35 is connected to the center rail 26 at pivotal connection 50 and the inner rail 35 is also connected to the forward rail link cluster generally designated 52 at pivotal connection 54. The lower end of the inner rear rail 35 is connected at its rearward and lowermost end via pivotal connection 56 to an attachment plate 58. The attachment plate 58 secures the convertible top to the coach frame of the vehicle via suitable attaching bolts 60. This plate 58 pivotally mounts the actuating cylinder 62 of the actuating system 32 at trunnions 64, as more clearly shown in FIG. 6. In order to provide suitable support for the trunnions 64 of the cylinder 62, the attaching plate 58 includes a bracket 58', which, as more clearly shown in FIGS. 5 and 6, is attached to the primary mounting bracket 58 by separable fasteners, such as bolt 60'.

It will be particularly noted from FIG. 6 of the drawing that the inner rear rail 35 is bifurcated at its lower end so that the pivotal mounting between the lower end of the inner rear rail and the bracket and plate is a dual pivotal connection and includes pivot 56' which joins furcation 35' to the bracket 58'.

The outer rear rail 37 of the pair of rear rails 28 is connected at its upper end, at pivotal connection 70, to the center rail 26. Further, an upward and forward extension 37' of the outer rear rail 37 is connected to the center bow 72 at pivotal connection 74, while the lower end of the outer rear rail is pivotally connected to the mounting plate 58 at pivotal connection 76.

The hydraulic cylinder 62 has a piston rod 80 which extends through the head 82 of the cylinder between the pair of trunnions 64 which pivotally mount the cylinder to the mounting plate 58 and its bracket 58'. The upper extended end 84 of the piston rod 80 is pivotally connected to a pair of rocker links 86. Each of the pair of rocker links 86 is generally triangular in vertical plan view, as shown more clearly in FIG. 2 of the drawing, and the opposite ends of the pair of links 86 are pivotally mounted to an ear portion 90 of the inner rear rail 35 by pivot pin 92. This same pin 92 pivotally mounts the lower end of the rear bow 94.

Intermediate between the pivotal connections 92 and 88 of the pair of rocker links 86 is mounted a control link 100 via pivot pin 102. The lower end of the control link 100 is pivotally mounted to the mounting plate 58 at pivotal connection 104, whereby power exerted by the hydraulic cylinder 62 through piston rod 80 is transmitted to the pair of rocker links 86, thence to the inner member 35 of the pair of rear rails 28 via the pivotal connection between the rocker links 86 and said rail at pivotal connection 92. Application of force from the piston rod 80 to the inner rear rail 35 is controlled by the control link 100 during movement of the rear rails from there folded position, as shown in FIG. 3, to the fully extended position as shown, for example, in FIGS. 1 and 2.

Power for each of the pair of hydraulic cylinders 62 is from a combined electric motor, pump and reservoir unit 110 via flexible conduits 112 and 114 connected to the lower and the upper ends respectively of each of the cylinders.

Referring particularly to FIG. 6 and FIG. 7 it will be seen that the pair of rear rails 35 and 37 are closely spaced and in generally parallel side-by-side relationship when the top is in the extended position to be a relatively high line to the top structure. However, when the top is fully folded, as shown in FIGS. 4 and 5, the pair of rear rails 35 and 37 are displaced laterally and vertically to provide substantial room for the folded portion of the top fabric indicated at A in FIG. 4.

As more clearly shown in FIG. 4 of the drawing, the outer rear rail 37 and the front and center rails 24 and 26 support window sealing, resilient members 120, 122 and 124. In addition, the outermost edge 126 of each of the outer rear rails 37 has means 128 for attaching the fabric 25 to the rails while the opposite end portions of the fabric are attached to a portion of the inner weldment 128 of the vehicle by strip members 130 at the sides and clamping block 132 at the rear end adjacent the hard glass window 134, as more clearly shown in FIG. 3 of the drawings.

From the foregoing description of the various elements comprising the improved convertible top linkage mechanism, it will be seen that the rear rail consists of a pair of generally parallel side-by-side closely spaced elements when the top is in the extended position; that each of the pair of generally parallel closely spaced rear rails is independently pivotally connected to the center rail that means pivotally mount the rear ward ends of each of the rear rails to the vehicle and said means are generally rectilinearly aligned with the longitudinal axis of the pair of rear rails when the top is extended; that the actuator means comprising the piston rod is pivotally connected to the inner most of the pair of rear rails; that the fabric trim supporting means is connected to the outer surface of the outermost of the pair of rear rails and that the assembly does not include a conventional control link to thereby provide additional room in the rearward seat of the vehicle when the top is in the extended position and at the same time the assembly presents a smoother interior contour.

From the foregoing description of the improved convertible top assembly, it will be seen that the present invention fully accomplishes the aims and objects hereinbefore set forth and it will be appreciated by those skilled in the art that various modifications may be made in the form of the structures and the means for actuating them without departing from the scope of the appended claims.

I claim:

1. In a convertible top assembly including articulately jointed front rails and center rails and a pair of inward and outward rear rails, the pair of rear rails being positioned such that they are in closely spaced lateral side-by-side relation when the convertible top assembly is in the extended position to provide smoothly contoured inner and outer surfaces, pivot pin means connecting the lower ends of each of the pair of rear rails to a mounting bracket at longitudinally spaced points, means pivotally mounting the other end of the innermost of the pair of rear rails to the center rail intermediate the ends of the center rail, means pivotally mounting the outer end of the outer rear rail to the rearward end of the center rail, actuator means pivotally connected to at least one of the rear rails to move the rear rails through an arc from the top extended to the folded top positions and to cause said pair of rear rails to actuate the center rail through the spaced pivotal connections between the pair of rear rails and the center rail 2. The invention defined in claim 1 wherein said pair of rear rails are generally parallel and in closely spaced side-by-side position when the convertible top is in the extended position and said rear rails are laterally spaced and vertically offset when the convertible top is in the folded position.

3. The invention defined in claim 1 wherein the outer one of the side-by-side rear rails controls the positioning of the top rails during extension and retraction of the folding top.

4. The invention defined in claim 1 wherein the outer one of the side-by-side rear rails includes means carrying pliable weather sealing strips for the folding top.

5. The invention defined in claim 1 wherein said means pivotally mounting the rearward end of each of the rear rails to a vehicle body comprises longitudinally spaced pivots whereby the inner of each side-by-side rear rails functions as a compression member and the outer of said side-by-side rear rails functions as a tension member.

6. The invention defined in claim 1 wherein the means pivotally mounting the rearward ends of each of the rear rails to the vehicle body are generally rectilinearly aligned with the longitudinal axes of the pair of rails when the roof is in the extended position.

7. The invention defined in claim 6 wherein said means pivotally mounting the rearward ends of each of the rear rails to a vehicle body are also longitudinally spaced from each other.